3,367,964
12-OXYGENATED-A-NORANDROST-3-ENES

Seymour D. Levine, North Brunswick, and Pacifico A. Principe, South River, N.J., assignors, by mesne assignments, to E. R. Squibb & Sons., Inc., New York, N.Y., a corporation of Delaware
No Drawing. Filed Sept. 20, 1965, Ser. No. 488,773
5 Claims. (Cl. 260—488)

This invention relates to and has as its object the provision of novel physiologically active steroids, and methods for their production.

More particularly, this invention relates to the production of compounds of the formula

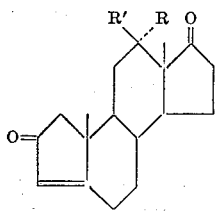

wherein R is hydrogen; R' is selected from the group consisting of hydroxy and acyloxy; and together R and R' is oxo (O=).

The preferred acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The compounds of the instant invention are physiologically active steroids which possess anti-androgenic activity, i.e., they inhibit the action of androgens, and they may be used in the treatment of such conditions as hyperandrogenic acne.

The compounds may be formulated for such administration, the concentration and/or dosage being based on the activity of the particular compound and the requirements of the patient.

The novel compounds of this invention may be prepared according to the process of this invention by employing as the starting material, $\Delta^3$-A-norandrostene-2,17-dione.

The novel compounds of the instant invention may be prepared from the starting material by subjecting the latter to the action of the enzymes of Colletotrichum derridis under oxidizing and preferably aerobic conditions. The oxidation can best be effected by either including the starting material in an aerobic culture of the microorganism, or by bringing together, in an aqueous medium, the compounds, air, and enzymes of non-proliferating cells of the microorganism.

In general, the conditions of culturing the microorganism for the purpose of this invention are (except for the inclusion of the starting material to be converted) the same as those of culturing microorganisms for the production of antibiotics, i.e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch, or dextrin), a fatty acid, a fat and/or the compound itself. Preferably, however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fatty acids utilizable for the purpose of this invention are: stearic acid, palmitic acid, oleic acid, linoleic acid, and myristic acid.

The source of nitrogenous factors may be organic (e.g., soybean meal, corn steep liquor, meat extract and/or distillers solubles) or synthetic (i.e., composed of simple, synthesizable organic or inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of concentration of the starting material is about 0.01 to 0.10%. The culture period (or rather the time of subjecting the compound to the action of the enzyme) may vary considerably, the range of about six to ninety-six hours being feasible, but not limiting.

The process yields, inter alia $\Delta^3$-A-norandrostene-12β-ol-2,17-dione. The $\Delta^3$-A-norandrostene-12β-ol-2,17-dione can be esterified in the usual manner, as by treatment with the desired acid anhydride or acyl halide in an organic solvent (preferably in an organic base such as pyridine) to yield the 12β-ester derivative, or it may be oxidized to yield the 12-keto derivative.

The following examples are illustrative of the invention:

EXAMPLE 1

*12β-hydroxy-$\Delta^3$-A-norandrostene-2,17-dione*

(A) *Fermentation.*—Surface growth from each of 2-two week old agar slants of *Colletrichum derridis* (CBS) (Centraalbureau voor Schimmel Cultures, Baarn, Netherlands) the slants containing as a nutrient medium (A):

| | Grams |
|---|---|
| Oatmeal | 20 |
| Tomato paste | 20 |
| Agar | 15 |
| Tap water to 1 liter. | | is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

| | Grams |
|---|---|
| Dextrose | 10 |
| Cornsteep liquor | 6 |
| $NH_4H_2PO_4$ | 3 |
| Yeast extract | 2.5 |
| $CaCO_3$ | 2.5 |
| Distilled water to 1 liter. | |

After 72 hours incubation at 25° C. with continuous rotary agitation( 280 cycles/minute; two inch radius), 10% (vol./vol.) transfers are made to thirty-four 250 ml. Erlenmeyer flasks each containing 50 ml. of freshly sterilized medium B. After 24 hours of further incubation, using the same conditions as described above, the steroid (300 micrograms/ml.) is added by supplementing each flask with 0.25 ml. of a sterile solution (60 mg./ml.) of $\Delta^3$-A-norandrostene-2,17-dione in N,N-dimethylformamide. A total of 510 mg. is fermented.

After 72 hours of further incubation, using identical conditions as described above, the contents of the flasks are pooled and the broth is then filtered through a Seitz clarifying pad. The flasks, mycelium and pad are washed

3 with successive 50 ml. portions of warm water. The combined filtrate and washings have a volume of 1800 ml.

(B) *Isolation.*—The thus obtained filtrate is extracted three times with chloroform. The chloroform extracts are washed three times with water, dried over sodium sulfate and evaporated to dryness. Plate chromatography of the residue using neutral alumina (Activity V) as the adsorbent and chloroform as the developing solvent gives two major bands which are detected by ultraviolet, eluted with ethyl acetate and combined. Rechromatography of this material as described above gives a major band which is crystallized from chloroform-isopropyl ether to give about 111 mg. of 12β-hydroxy-Δ³-A-norandrostene-2,17-dione having a melting point of about 228–230°. The analytical sample is prepared by recrystallization from chloroform-isopropyl ether, M.P. about 235–237°; [α]$_D^{26}$ +51° (EtOH); λ$^{KBr}$ 2.82, 5.81, 5.93 and 6.18μ; λ$^{EtOH}$ 231 mμ (14,700);

$\tau_{CDCl_3}^{TMS}$ 8.99 (s, 18-Me), 8.79 (s, 19-Me), 6.21 (d,d,d,J=~1–2 c.p.s., 8 c.p.s., 9.5 c.p.s., 12α-H), and 4.25 (s, 3-H).

*Analysis.*—Calcd. for $C_{18}H_{24}O_3$ (288.37): C, 74.97; H, 8.39. Found: C, 75.06; H, 8.28.

EXAMPLE 2

*12β-acetoxy-Δ³-A-norandrostene-2,17-dione*

A solution of 0.0033 ml. of perchloric acid in 0.3 ml. of acetic anhydride is added to 500 mg. of 12β-hydroxy-Δ³-A-norandrostene-2,17-dione in 10 ml. of acetic anhydride. The reaction mixture is stirred at room temperature for 30 min. and then poured into ice-water and extracted with chloroform. The chloroform extracts are washed with a saturated sodium bicarbonate solution, 8% salt solution, dried over sodium sulfate nad evaporated to dryness to give 12β-acetoxy-Δ³-A-norandrostene-2,17-dione.

EXAMPLE 3

*Δ³-A-norandrostene-2,12,17-trione*

A solution of 50 mg. of 12β-hydroxy-Δ³-A-norandrostene-2,17-dione in 10 ml. of acetone is treated dropwise with an equivalent amount of chromium trioxide-sulfuric acid. The chromic sulfate is removed by filtration and washed with additional acetone. The filtrate is concentrated, diluted with water and extracted with chloroform. The chloroform extracts are washed with 8% salt solution, dried over sodium sulfate and evaporated to dryness to give Δ³-A-norandrostene-2,12,17-trione.

This invention may be variously otherwise embodied within the scope of the appended claims.

What is claimed is:

1. A compound of the formula

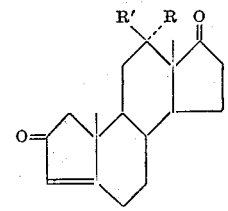

wherein R is hydrogen; R' is selected from the group consisting of hydroxy and the acyloxy radical of a hydrocarbon carboxylic acid of less than twelve carbon atoms; and together R and R' is oxo.

2. 12β-hydroxy-Δ³-norandrostene-2,17-dione.

3. A lower alkanoic acid ester of 12β-hydroxy-Δ³-A-norandrostene-2,17-dione.

4. 12β-acetoxy-Δ³-norandrostene-2,17-dione.

5. Δ³-A-norandrostene-2,12,17-trione.

References Cited

UNITED STATES PATENTS 3,210,460  10/1965  Weisenborn _____ 260—488

LORRAINE A. WEINBERGER, *Primary Examiner.*

V. GARNER, *Assistant Examiner.*